Dec. 17, 1929.  J. WIKSCHTRÖM  1,739,745
MACHINE FOR THE MANUFACTURE OF NAILS FROM WIRE
Filed Aug. 27, 1927    6 Sheets-Sheet 5
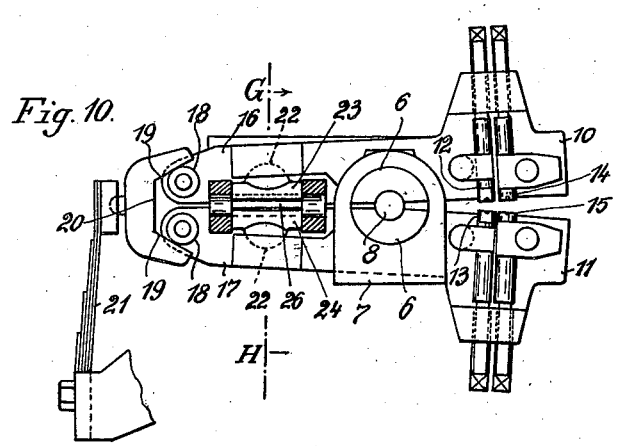
Inventor:
Jakob Wikschtröm,

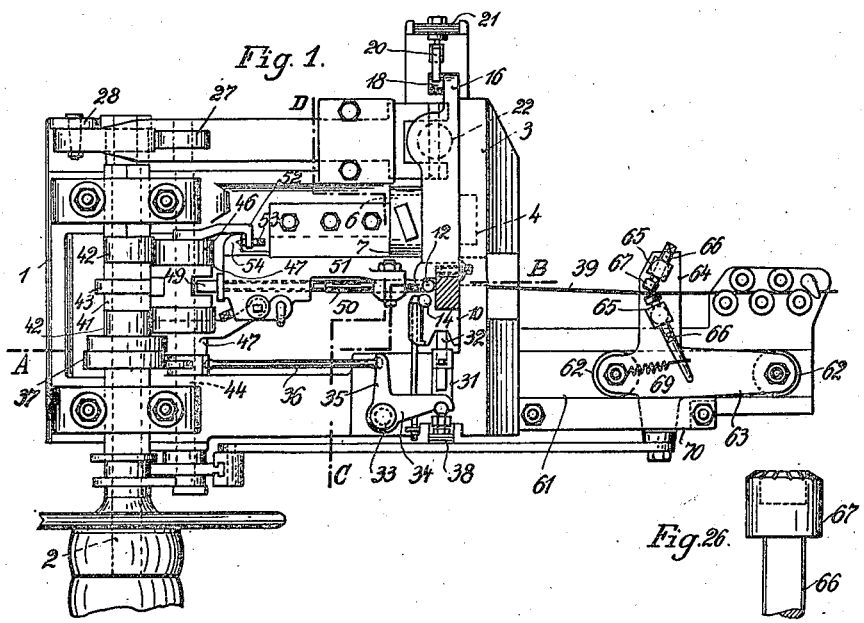
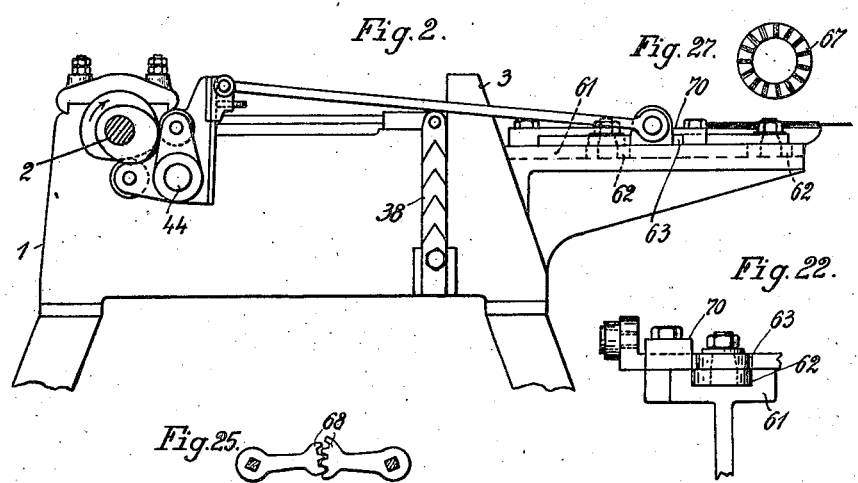
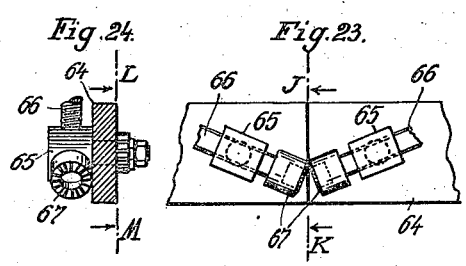

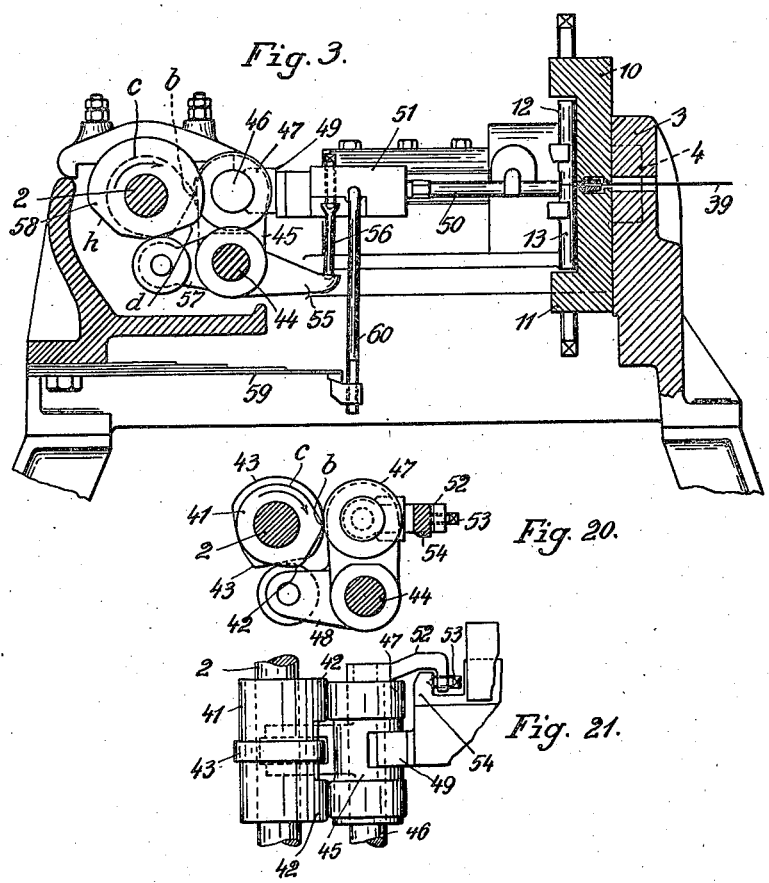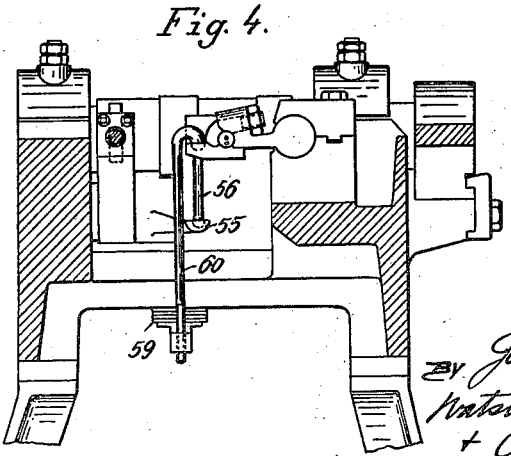

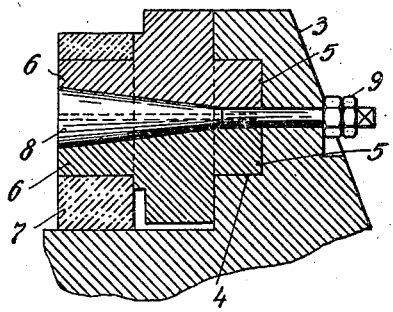
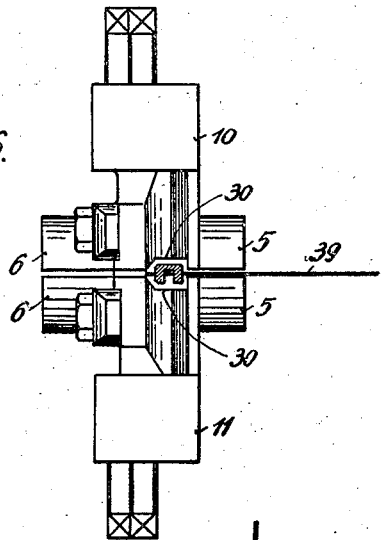
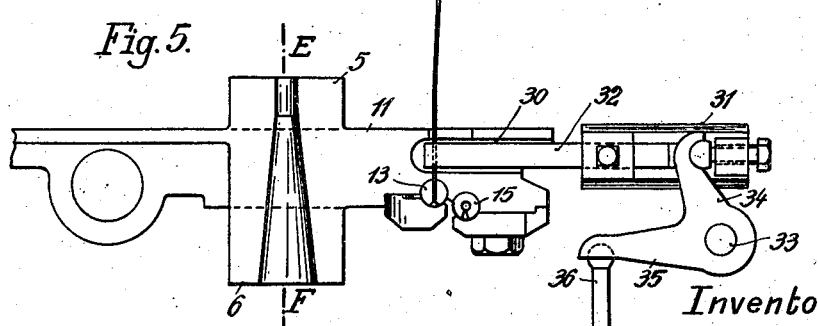

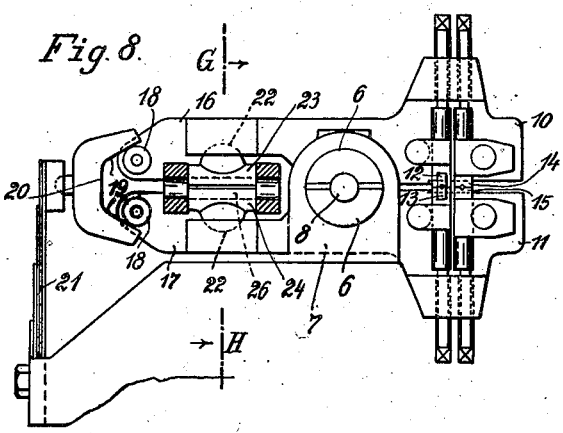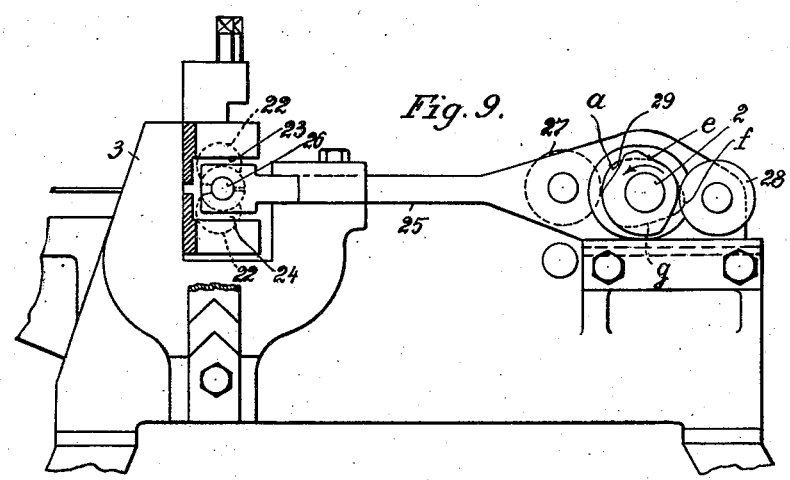

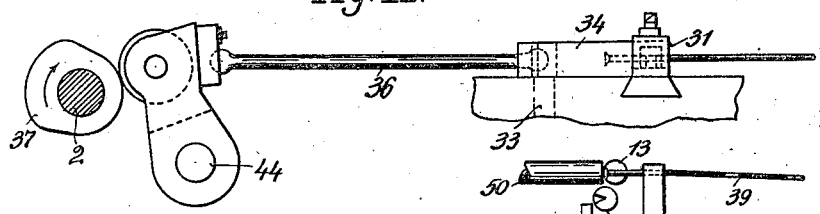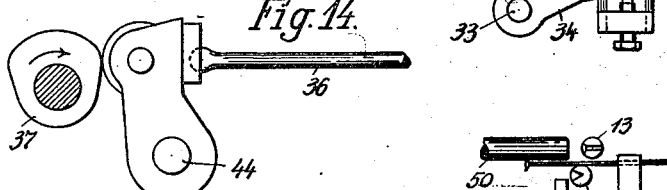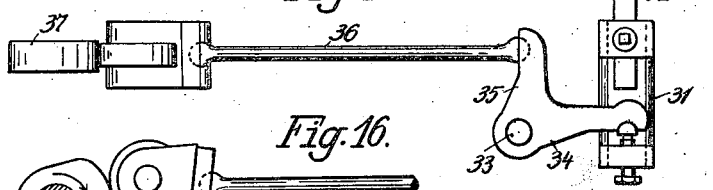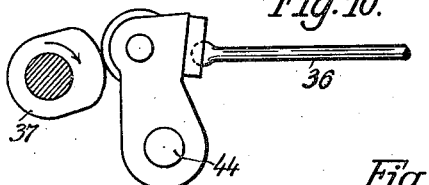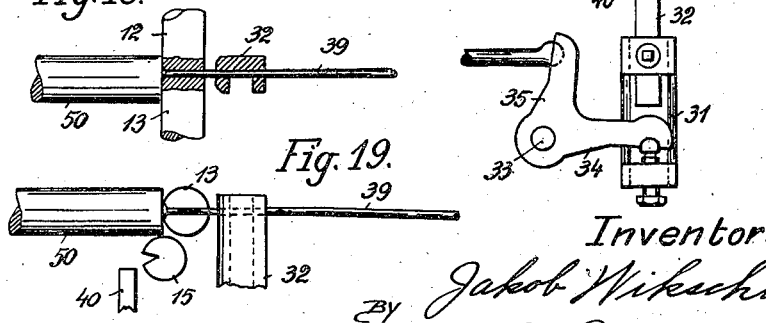

Patented Dec. 17, 1929

1,739,745

UNITED STATES PATENT OFFICE

JAKOB WIKSCHTRÖM, OF DUSSELDORF, GERMANY

MACHINE FOR THE MANUFACTURE OF NAILS FROM WIRE

Application filed August 27, 1927, Serial No. 215,886, and in Germany September 6, 1926.

My invention relates to machines for the manufacture of nails from wire and consists substantially in a special arrangement and drive of the levers carrying the clamping jaws and the point cutters and also in the device necessary for feeding the wire into the range of the clamping jaws and knives.

One clamping jaw and one knife of the clamping jaws and point cutters are journalled in one lever of a pair of levers. It is well known to so journal this pair of levers, that the axis of rotation of it is at right angles to the axis of the wire. In contradistinction to this the pair of levers according to the invention is mounted on pivots the center of rotation of which is lateral and parallel to the wire axis. At the side facing the wire feed, the levers bear over their whole length against the machine frame, whereby a reliable bearing is obtained and wear of the surfaces during the pressing of the nail head is reduced. Particularly the output of the point cutters will be substantially increased by this arrangement.

Whereas hitherto the knives must be opened so far, that during the upsetting of the nail head the stamping tool may freely pass, according to the present invention a smaller movement of the levers is possible, because the levers carrying the clamping jaw and cutters need to open so far only, that the wire may freely be moved between the tools. Hereby the friction of the levers in their bearings and against the machine frame is reduced which also results in a reduction of wear. Dirt resulting from the operation does not come into contact with the bearing.

The levers are directly moved by the main shaft by means of a slide.

The guide for the displacement of the wire into the level of the clamping jaws or cutters is arranged at the side of the wire opposite the bearings of the levers. The end of the guide loosely passes between the levers, so that jamming and soiling is prevented and an easy and exact adjustment is possible.

In the accompanying drawings a machine according to the invention is shown by way of example.

Fig. 1 is a plan view of the new machine, Fig. 2 shows a side view, Fig. 3 is a section on line A—B of Fig. 1, Fig. 4 is a section on line C—D of Fig. 1, Fig. 5 shows a plan view of the lower lever carrying a clamping jaw and a point cutter. This view also representing the means for displacing the wire, Fig. 6 is a front view of both levers, Fig. 7 is a section on line E—F of Fig. 5 through the bearings of the levers, Figs. 8–11 show the cutter levers and their drive in two different operating positions, Figs. 12–17 show three different operating positions of the device for displacing the wire across the direction of feed, Fig. 18 and 19 are details on a larger scale of the device shown in Figs. 12–17, Fig. 20 and 21 show a side view and a plan respectively of the drive for the head pressing stamp, Fig. 22 shows the guide of the slide for the wire feed device and Figs. 23–27 are details of the wire feed device.

In the frame 1 of the machine the main shaft 2 is journalled which carries the cams necessary for the different operating movements. At a wall 3 of the frame arranged parallel to the drive shaft a bearing 4 is provided lateral of the wire feed device in the same level as said device. Into this bearing fit the semi-circular pivots 5 of two double-armed levers each carrying a clamping jaw and a point cutter. The other pivots 6 of these levers are arranged in a bearing 7 (Fig. 7) fixed to the machine frame. The levers and their pivots are provided with a conical hole for receiving a correspondingly shaped bolt 8 which may be adjusted by means of a nut 9 for the purpose of exactly guiding the levers in their bearing.

The lever arms 10 and 11 extend into the level of the wire and carry the clamping jaws 12, 13 and the cutters 14, 15. The other arms 16, 17 of the double-armed levers are provided with rollers 18 which are surrounded by a fork-shaped element 20 having inclined surfaces 19. A spring 21 (Fig. 8) fixed to the machine frame acts upon the element 20.

The arms 16, 17 have, as shown in Fig. 10, hemispherical recesses 22 in which fit hemispherical links 23, 24. One end of a slide 25 (Figs. 9 and 11) arranged in the machine frame is forked and in this fork-shaped end a pin 26 is fixed against both sides of which the link members 23, 24 bear, so that a toggle lever results. The slide 25 is arranged in the level of the main shaft 2 and its free end carries rollers 27, 28 between which a recess is provided.

Through this recess passes the main shaft 2 which at this point carries a cam effecting the reciprocating movement of the slide 25.

In the level of the wire elongated slots 30 (Figs. 5 and 6) are provided in the arms 10, 11.

In front of the lever arms a slide 31 is arranged in the machine frame which is movable in vertical direction to the axis of the wire and which carries a guide piece 32 extending into the elongated slots 30. The guide piece 32 is not in contact with the walls of the slots. At 33 an angle-lever is pivoted one arm 34 of which acts upon the slide 31 while the other arm 35 is influenced by a connecting rod 36 which is actuated by a cam 37 mounted upon the main shaft 2. A spring 38 (Fig. 1) acts upon the slide 31 tending to move it against the lever arms 10, 11.

The free end of the guide piece 32 is provided with a hole through which passes the wire 39. An adjustable abutment 40 (Fig. 17) is provided for the wire.

In the center of the machine the portion 41 of the main shaft 2 is provided at both ends with cams 42 of equal shape while the middle portion carries a special cam 43. Parallel and in front of the main shaft 2 a shaft 44 (Figs. 3, 20, 2) is arranged upon which an angle-lever is pivoted. One arm 45 of this angle-lever extends vertically upwards and carries in the level of the main shaft 2 a pin 46 upon which rollers 47 are mounted. These rollers 47 are actuated by the cams 42. The other arm 48 also carries a roller which is influenced by the cam 43.

The lever 45 is cut away in its middle portion, so that the pin 46 is exposed. Against this part a pressure piece 49 bears against which rests the lever 51 carrying the head pressing tool 50.

The lever 51 is in a well known manner rotatable about an axis arranged lateral to the wire axis and, as shown in Fig. 4, this lever is also shiftable. The lever 51 is connected to the pressure piece 49 by means of an arm 52 mounted upon the pin 46. The arm 52 carries an adjustable pin 53 which is arranged exactly in the prolongation of the pivot axis of the lever 51 and acts upon a projection 54 of this lever.

Mounted upon the shaft 44 is a double-armed lever the arm 55 of which acts upon the lever 51 by means of an intermediate rod 56. The other arm 57 is influenced by the cam 58. The lever 51 is held in contact with the rod 56 by the hook-shaped end of a rod 60 which is under the control of a spring 59.

The wire feed (Figs. 1 and 2) consists of a slide 63 movable in the guide 61 and provided with rollers 62. The slide 63 is driven in known manner from the main shaft 2.

Upon an arm 64 of the slide 63, crossing the wire and situated below said wire, parts 65 are pivoted in which pins 66 are movable longitudinally and rotatably. The pins 66 carry at their ends annular jaws 67 provided with notches in their surfaces. The pins 66 form an angle with the wire, so that they act upon the wire in the manner of a toggle joint.

The pivots of the parts 65 carry arms 68 arranged below the arm 64 and provided with toothed segments. One of the pins is influenced by a spring 69 fixed to the slide 63. By means of the cover plate 70 (Fig. 22) the slide 63 is guided horizontally.

The new machine operates as follows:

Figs. 3, 5, 8, 9, 12, 13 and 20 show the position of the parts when finishing the nail head.

The wire has been fed into the center of the clamping jaw channel by the guide piece 32 arranged at the slide 31.

The lift $a$ of the cam 29 has pressed the slide 25 to the left, whereby the links 23, 24 have been brought into the position shown in Fig. 9 and the lever arms 10, 11 have been moved towards each other (Fig. 8).

Hereby the wire is clamped between the jaws 12, 13 and the nail head is pressed by the preliminary and final upsetting. By means of the lift $b$ of the cam 42 of the part 41 (Figs. 3 and 20) the head stamping tool has been pressed against the already preliminarily upset wire end protruding from the clamping jaws (Fig. 3).

By the juxtapositioned flattened surface $c$ the head stamping tool is now moved away from the clamping jaws. By the lift $d$ (Fig. 3) of the cam 58 the lever arm 57 is depressed and by the other arm 55 the lever 51 and with this the head stamping tool is raised so far, that the wire provided with a head may freely move laterally.

Thereupon the lever arms 10, 11 are opened by means of the flattened part $e$ of the cam 29 (Fig. 9) which, in accordance with the two staggered rollers 27, 28, consists of two staggered portions. The clamping jaws 12, 13 release the wire which is moved laterally by the slide 31. Hereby the wire is simultaneously fed (Figs. 15, 17). In the end position (Fig. 17) the wire lies in the center of the cutters 14, 15 and is held in this position by the abutment 40. The lift $f$ of the cam 29 now causes a movement of the cutters against each other to cut the point. By the juxtapositioned flattened surface $g$ the cutters are opened. The finished nail drops and by the slide the remaining end of wire is again returned to the position shown in Fig. 13 and clamped between the jaws. Simultaneously the stamping tool 50 is depressed by the action of the flattened surface $h$ of the cam 58 (Fig. 3), so that the pre-upsetting die of the tool 50 comes to lie opposite the end of the wire. After the pre-upsetting the tool 50 is by a further rotation brought into the finishing upsetting position and now the described circle of operations is repeated.

The part of the main shaft 2 subjected to the highest pressure is substantially reinforced by combining the two cams 42, 43 to a common large part 41 (Fig. 21).

The guide piece 32 provided at the slide 31 (Fig. 5) is, as shown in Fig. 6, preferably U-shaped, to prevent clogging of the guide hole by impurities adhering to the wire and to reduce the friction.

After the clamping jaws have been opened the wire is fed by the movement of the slide 63.

Under the action of the spring 69 the jaws 67 (Fig. 1) are pressed against the wire which is thereby fed. The toothed segments of the arms 68 cause the clamping jaws to press against the wire. These jaws may be moved away from the wire by operating a handle. In case of wear of the notches provided at the jaws, the annular shape of said jaws allows to bring other working-points into the range of the wire by simply turning the bolts about their axes. The arrangement of the guide rollers 62 prevents jamming of the slide 63, whereby wear of the guide-way is reduced. The cover plate 70 provides a reliable guide for the slide.

The new wire feed allows the quick and reliable feed of the wire required by the new machine. During the return of the feed slide the wire is not scraped without a particular release of the feed jaws which release is absolutely necessary if feed chisels are used.

What I claim is:

1. In a machine for the manufacture of nails from wire, double-armed levers, each carrying a clamping jaw and a point cutter, pivotally mounted upon an axis arranged laterally and parallel to the axis of the wire in the level of same, a thrust element engaging said levers for resisting movement of said levers axially of said wire, a slide for closing and opening said clamping jaws and point cutters, a bolt carried by a fork-shaped end of said slide, links bearing at both sides against said bolt and forming a toggle lever, and spherical ends of said links engaging arms of said double-armed levers, so that the operating pressure substantially acts upon the hemispherical surfaces and the bolt.

2. In a machine for the manufacture of nails from wire, double-armed levers, each carrying a clamping jaw and a point cutter, pivotally mounted upon an axis arranged laterally and parallel to the axis of the wire in the level of same, a thrust element engaging said levers for resisting movement of said levers axially of said wire, a slide for closing and opening said clamping jaws and point cutters, a bolt carried by a fork-shaped end of said slide, links bearing at both sides against said bolt and forming a toggle lever, the spherical ends of which engage the arms of said double-armed levers, rollers carried by said arms and a spring pressed fork-shaped element provided with inclined surfaces engaging said rollers, whereby the opening of the clamping jaws and point cutters is facilitated.

3. In a machine for the manufacture of nails from wire, double-armed levers, each carrying a clamping jaw and a point cutter, pivotally mounted upon an axis arranged laterally and parallel to the axis of the wire in the level of same, a thrust element engaging said levers for resisting movement of said levers axially of said wire, a slide for closing and opening said clamping jaws and point cutters, a recess in said slide for receiving the main shaft and a cam on said shaft in said recess for causing the reciprocating movements of said double-armed levers.

4. In a machine for the manufacture of nails from wire, double-armed levers, each carrying a clamping jaw and a point cutter, pivotally mounted upon an axis arranged laterally and parallel to the axis of the wire in the level of same, a thrust element engaging said levers for resisting movement of said levers axially of said wire, a slide for closing and opening said clamping jaws and point cutters, a recess in said slide for receiving the main shaft, an elongated slot in each of the arms of said double-armed levers supporting a clamping jaw and a point cutter and a guide piece for the wire provided at a cross-slide and extending into the slot in such a manner as to be out of engagement with the walls of said slot.

5. In a machine for the manufacture of nails from wire, double-armed levers, each carrying a clamping jaw and a point cutter, pivotally mounted upon an axis arranged laterally and parallel to the axis of the wire in the level of same, semicylindrical bearings for said levers, a conical recess in said bearings, a bolt fitting in said recess, a nut on said bolt for drawing said bolt into said recess to exactly guide said levers in their bearings, a thrust element engaging said levers for resisting movement of said levers axially of said wire, a slide for closing and opening said clamping jaws and point cutters, a recess in said slide for receiving the main shaft and a cam on said shaft in said recess for causing the reciprocating movements of said double-armed levers.

6. In a machine for the manufacture of nails from wire, double-armed levers, each carrying a clamping jaw and a point cutter, pivotally mounted upon an axis arranged laterally and parallel to the axis of the wire in the level of same, a thrust element engaging said levers for resisting movement of said levers axially of said wire and a slide for shifting said wire into the plane of the said jaws and point cutters respectively.

7. In a machine for the manufacture of nails from wire, the combination with a pair of levers mounted for pivotal movement in a direction substantially perpendicular to the axis of the wire, of a clamping jaw and a point cutter carried by each lever, a thrust element engaging said levers for resisting movement of said levers axially of said wire, and means for shifting said wire laterally to place the same in position for the clamping or cutting operations.

8. In a machine for the manufacture of nails from wire, the combination with a pair of levers mounted for pivotal movement in a direction substantially perpendicular to the axis of the wire with the working portions thereof disposed at spaced points in the plane of movement of said levers, of a clamping jaw and a point cutter carried by each lever, means for operating said levers, a thrust element engaging said levers for resisting movement of said levers axially of said wire, and means for shifting said wire laterally to position the latter for alternate engagement by said clamping jaws or said point cutters.

In testimony whereof I affix my signature.

JAKOB WIKSCHTRÖM.